United States Patent
Matsuoka

(10) Patent No.: US 8,023,149 B2
(45) Date of Patent: Sep. 20, 2011

(54) COLOR PROCESSING METHOD AND APPARATUS

(75) Inventor: Hirochika Matsuoka, Koto-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 523 days.

(21) Appl. No.: 11/668,610

(22) Filed: Jan. 30, 2007

(65) Prior Publication Data

US 2007/0177175 A1    Aug. 2, 2007

(30) Foreign Application Priority Data

Feb. 2, 2006 (JP) ................................. 2006-026181

(51) Int. Cl.
*G06F 15/00* (2006.01)

(52) U.S. Cl. ........ 358/1.9; 358/3.09; 358/3.32; 358/1.1; 358/3.01; 358/2.1; 345/590; 345/589; 345/591; 345/581; 345/418

(58) Field of Classification Search .......... 358/1.9–3.32, 358/2.1, 2.99, 3.01–3.09, 3.1, 3.11, 3.12, 358/3.13, 3.14, 3.15, 3.16, 3.17, 3.18, 3.19, 358/1.1; 345/590, 589, 591, 581, 418, 10–29
See application file for complete search history.

(56) References Cited

U.S. PATENT DOCUMENTS

| 5,185,661 | A | * | 2/1993 | Ng ................................. 358/505 |
| 5,515,172 | A | * | 5/1996 | Shiau ........................... 358/520 |
| 5,729,362 | A | * | 3/1998 | Deishi et al. .................. 358/520 |
| 5,731,818 | A | * | 3/1998 | Wan et al. ..................... 345/590 |
| 5,933,252 | A | * | 8/1999 | Emori et al. ................... 358/500 |
| 6,301,393 | B1 | * | 10/2001 | Spaulding et al. ............ 382/240 |
| 6,381,036 | B1 | * | 4/2002 | Olson ........................... 358/1.9 |
| 7,116,441 | B1 | | 10/2006 | Matsuoka |
| 7,136,523 | B2 | | 11/2006 | Fukao et al. |
| 2002/0054307 | A1 | * | 5/2002 | Matsuoka ...................... 358/1.9 |
| 2003/0076336 | A1 | * | 4/2003 | Fukao et al. .................. 345/589 |
| 2003/0164968 | A1 | * | 9/2003 | Iida ............................... 358/1.9 |
| 2004/0001610 | A1 | * | 1/2004 | Murakami ..................... 382/100 |
| 2005/0146736 | A1 | * | 7/2005 | Matsuoka et al. ............. 358/1.9 |

OTHER PUBLICATIONS

Hayashi-Takaaki, Color Conversion Processing Method, Color Conversion Processor, and Recording Medium, Nov. 14, 2003, JP02003323609 translation.*

* cited by examiner

*Primary Examiner* — Benny Tieu
*Assistant Examiner* — Martin Mushambo
(74) *Attorney, Agent, or Firm* — Canon U.S.A., Inc., IP Division

(57) ABSTRACT

When generating a color conversion table for converting a device independent color into a device color, a conversion target color of the device independent color corresponding to a lattice point of the color conversion table is set based on color reproduction information indicating the relationship between the device color and device independent color. The conversion target color is changed to generate a plurality of neighbor colors of the conversion target color. The conversion target color and the plurality of neighbor colors are converted into device colors based on the color reproduction information, and the device color corresponding to the conversion target color is calculated from the conversion results.

6 Claims, 16 Drawing Sheets

FIG. 4B

| LUT GRID STRUCTURE DATA | STEP OF R VALUE : 0, 32, 64, ......, 224, 225 |
| --- | --- |
| | STEP OF G VALUE : 0, 32, 64, ......, 224, 225 |
| | STEP OF B VALUE : 0, 32, 64, ......, 224, 225 |
| LUT LATTICE POINT DATA | L*a*b* COORDINATES OF Grid(0, 0, 0) : (30, 0, -2) |
| | L*a*b* COORDINATES OF Grid(0, 0, 1) : (31, 2, -9) |
| | ..... |
| | L*a*b* COORDINATES OF Grid(0, 0, 8) : (34, 18, -33) |
| | L*a*b* COORDINATES OF Grid(0, 1, 0) : (34, -8, 0) |
| | ..... |
| | L*a*b* COORDINATES OF Grid(8, 8, 7) : (90, -4, 12) |
| | L*a*b* COORDINATES OF Grid(8, 8, 8) : (92, 0, 0) |

F I G. 11
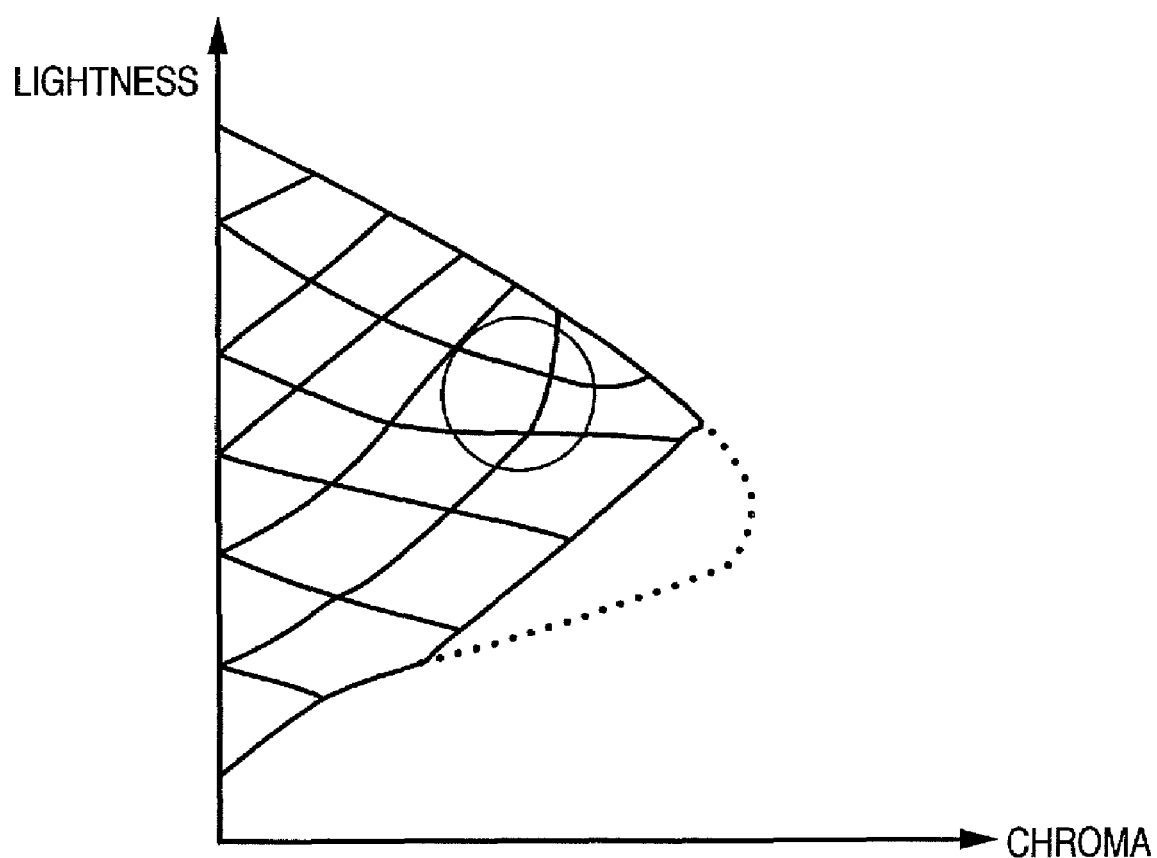

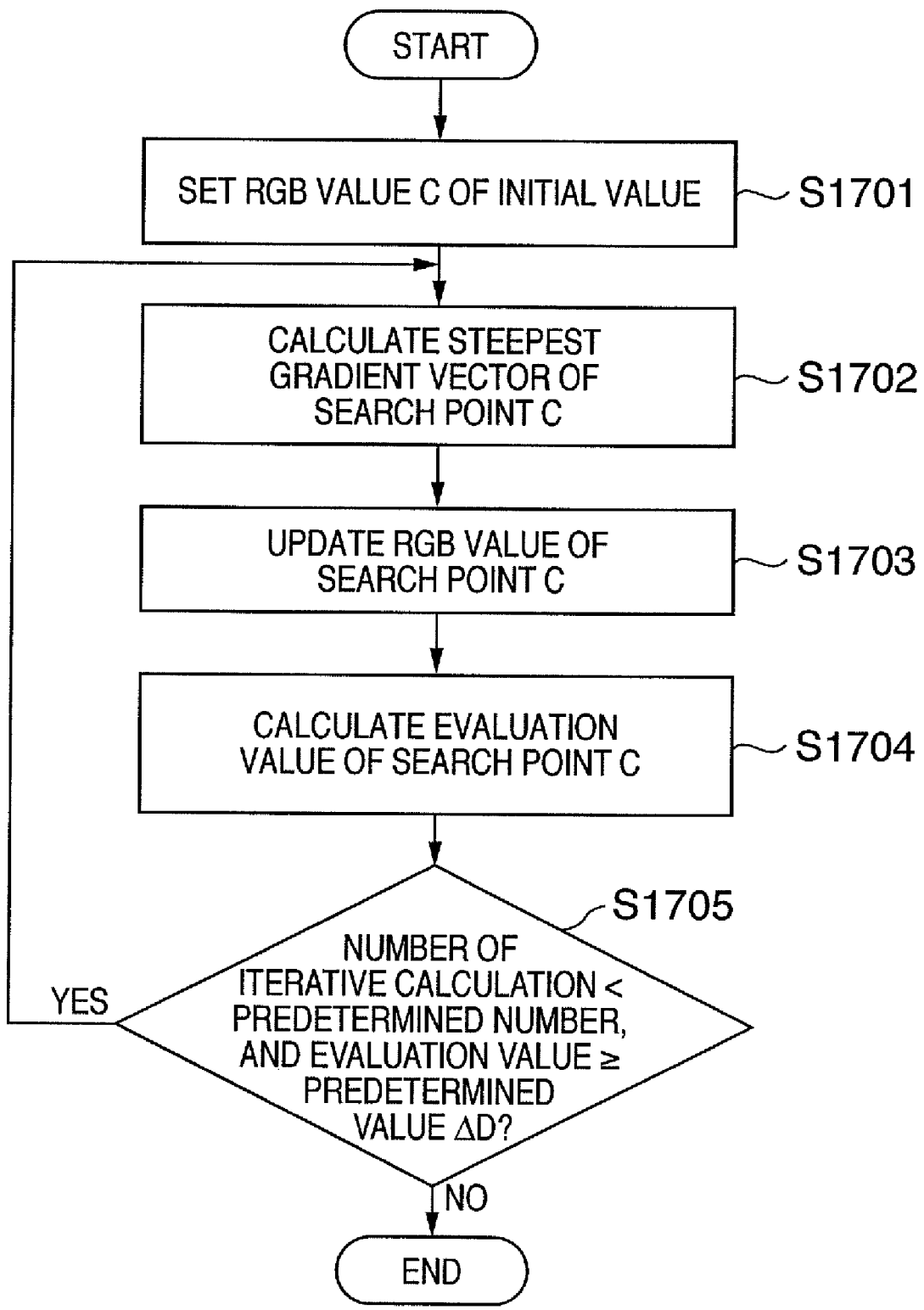

COLOR PROCESSING METHOD AND APPARATUS

BACKGROUND OF THE INVENTION

1. Field of the Invention

The present invention relates to color processing for generating a color conversion table for gamut mapping.

2. Description of the Related Art

In recent years, with the prevalence of personal computers and work stations, desktop publishing (DTP) and computer-aided design (CAD) have been widely used in general. Along with this, a color reproduction technique of matching a color reproduced on a monitor with a color reproduced on a printing medium using colorants is becoming increasingly important. For example, DTP operates in a workflow of executing creation, editing, modification, and the like of a color image on a monitor and then causing a color printer to output the color image. In this workflow, a user strongly demands that the color appearance of a color image (to be referred to as a monitor image) on the monitor matches that of an output image (to be referred to as a print image) of the printer.

However, it is difficult to match the appearances of a monitor image and print image in the color reproduction technique. This difficulty arises due to the following reasons.

A color monitor presents a color image by emitting light with a particular wavelength by using, e.g., phosphors. On the other hand, a color printer presents a color image by absorbing light with a particular wavelength by a colorant such as inks and using the residual reflected light. The color gamut of the color monitor is greatly different from that of the color printer because of the difference of the image display mode. Furthermore, even in a color monitor, the color gamut of a liquid crystal monitor which displays the three primary colors by using a color filter is different from that of a CRT which displays the three primary colors by using electron guns and phosphors. Of course, the color gamut of a color printer changes due to the difference of the paper quality, composition of the colorants, and the like.

FIGS. 1A and 1B are views showing a monitor gamut (FIG. 1A) and a printer gamut (FIG. 1B) as an example of a color gamut. As shown in FIGS. 1A and 1B, a color gamut greatly differs in each device. Therefore, it is impossible to completely match the colors of a monitor image and printer image, those of printer images output by a plurality of types of devices, or those of printer images output on a plurality of kinds of papers, in the calorimetric meaning.

As a technique of matching the appearances of color images by absorbing the difference of the color gamut between output media with different color gamuts, a gamut mapping technique of mapping a given color gamut onto another color gamut in a Lab space or JCH space is available. An example of the gamut mapping technique is a method of compressing and mapping a wide color gamut onto a narrow color gamut by using, e.g., a point on the lightness axis as a convergence point. According to such a mapping method, near the gamut boundary, color change is steep and image deterioration such as pseudo contour may occur. For example, FIG. 1A shows a monitor gamut and tone characteristics of the cyan hue. When performing gamut mapping, the tone characteristics may become distorted as represented by the solid lines in FIG. 1B. Particularly, in a region indicated by the circle in FIG. 1B, color change is steep and tone characteristics contort. Note that the dotted line in FIG. 1B represents a printer gamut.

In addition, as an element technique of a color matching technique, a color interconversion technique of a device independent color and device color is important. Color conversion from a device independent color into a device color in the color interconversion technique is used to accurately reproduce the mapping result by an actual device (e.g., a printer). In order to attain satisfactory tone reproduction, image deterioration such as an unnatural tone jump by this color conversion must be prevented as much as possible. However, this color conversion results in an optimization problem and often requires technically complex processing, e.g., use of a nonlinear programming to implement the conversion. It is difficult to keep satisfactory tone character in any case.

This problem is translated into a technical problem of how to correct the color conversion with poor tone reproduction. That is, a color interconversion technique which solves this technical problem and attains satisfactory tone reproduction is demanded. It is also demanded to achieve satisfactory color reproduction in various color conversions such as color conversion by mapping, color conversion from a device independent color into a device color, and the like.

SUMMARY OF THE INVENTION

According to an aspect of the present invention, a color processing method includes: obtaining gamut information of a color gamut of a destination; setting a mapping target color corresponding to a lattice point of a color conversion table; generating a plurality of neighbor colors of the mapping target color by changing a color value of the mapping target color; mapping the mapping target color and the plurality of neighbor colors in the color gamut of the destination based on gamut information; calculating a mapped color corresponding to the mapping target color from results of the mapping of the mapping target color and the plurality of neighbor colors; and storing a calculation result in the color conversion table.

Thus, a color conversion table for attaining good tone reproduction can be generated.

Further features of the present invention will become apparent from the following description of exemplary embodiments with reference to the attached drawings.

BRIEF DESCRIPTION OF THE DRAWINGS

FIG. 4B is a view showing the data structure of the color conversion LUT;

FIG. 11 is a view illustrating a mapping result;

FIG. 14 is a flowchart illustrating details of Lab value to RGB value conversion.

DESCRIPTION OF THE EMBODIMENTS

Color processing of an embodiment according to the present invention will be described in detail hereinafter with reference to the accompanying drawings.

First Exemplary Embodiment

[Arrangement of Apparatus]

Figure 2:
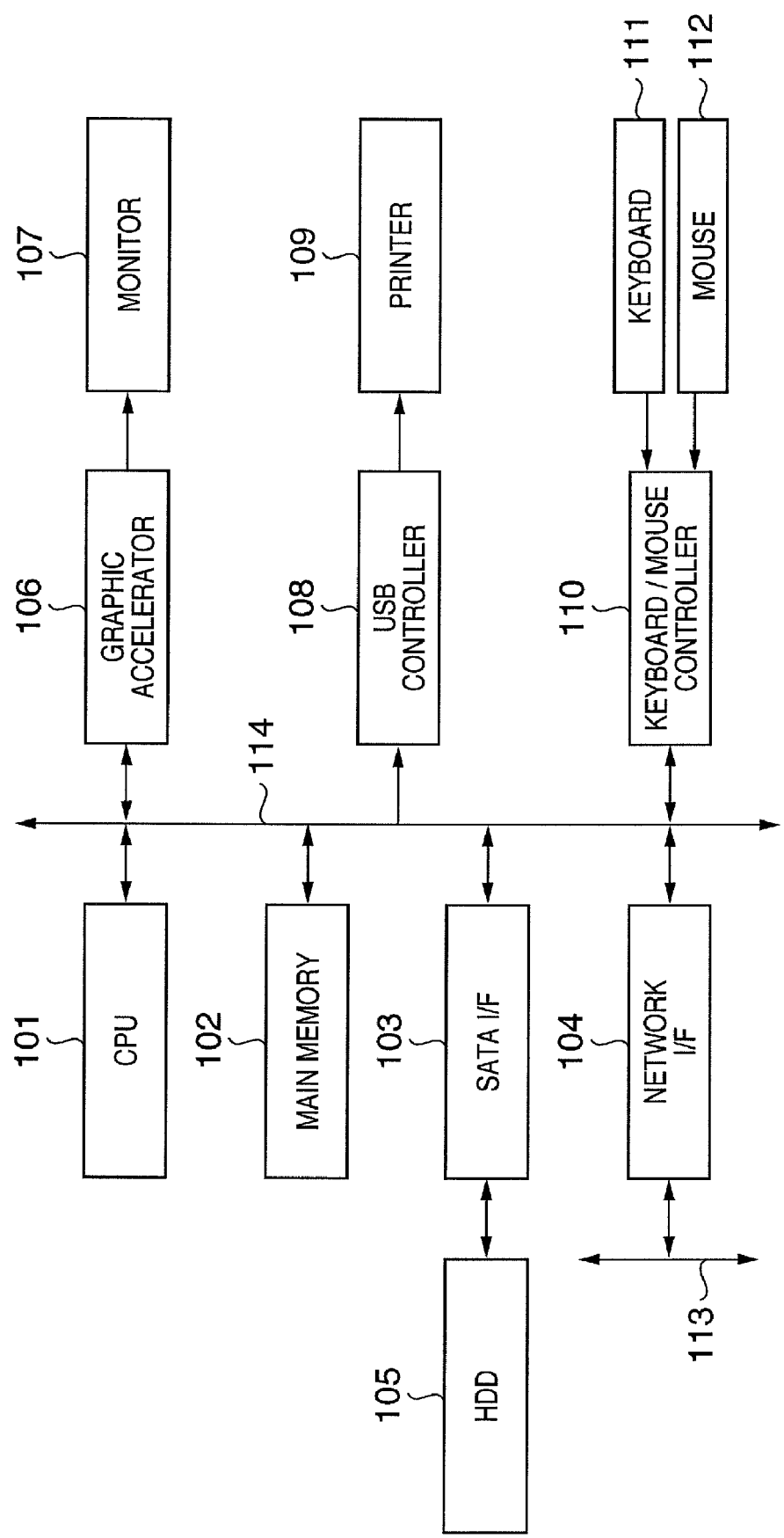
FIG. 2 is a block diagram showing the structure of a color processing apparatus.

FIG. 2 is a block diagram showing the arrangement of a color processing apparatus.

A central processing unit (CPU) 101 executes an operating system (OS) or various programs stored in a read-only memory (ROM) of a main memory 102 and a hard disk drive (HDD) 105, by using a RAM of the main memory 102 as a work memory. The CPU 101 controls the respective components via a system bus 114 such as a PCI (Peripheral Component Interconnect) bus. The CPU 101 further executes various programs including an image processing application, printer driver, color conversion lookup table (LUT) generation application, and device color conversion LUT generation application (to be described later).

The CPU 101 accesses the HDD 105 via the system bus 114 and serial ATA interface (SATA I/F) 103. The CPU 101 also accesses a network 113 such as a local area network (LAN) via a network I/F 104.

The CPU 101 displays a user interface of processing (to be described later) and a processing result in a color monitor 107 via a graphic accelerator 106. The CPU 101 inputs an input of a user's instruction via a keyboard 111 or mouse 112 connected to a keyboard/mouse controller 110.

The CPU 101 outputs image data via a USB (Universal Serial Bus) controller 108 to a printer 109, for printing, e.g., an image designated by the user.

[Printer Output]

Printer output of a digital image by the color processing apparatus will be described next. An example of using an RGB printer is described in the first embodiment, but another printer such as a CMYK printer can be also used.

The image processing application running on the color processing apparatus is notified of a print instruction by a user via the keyboard 111 or mouse 112. The image processing application notifies, in accordance with the user's instruction, the OS of print of digital image data stored in the main memory 102. The OS calls the printer driver and instructs print of the digital image data.

Figure 3:
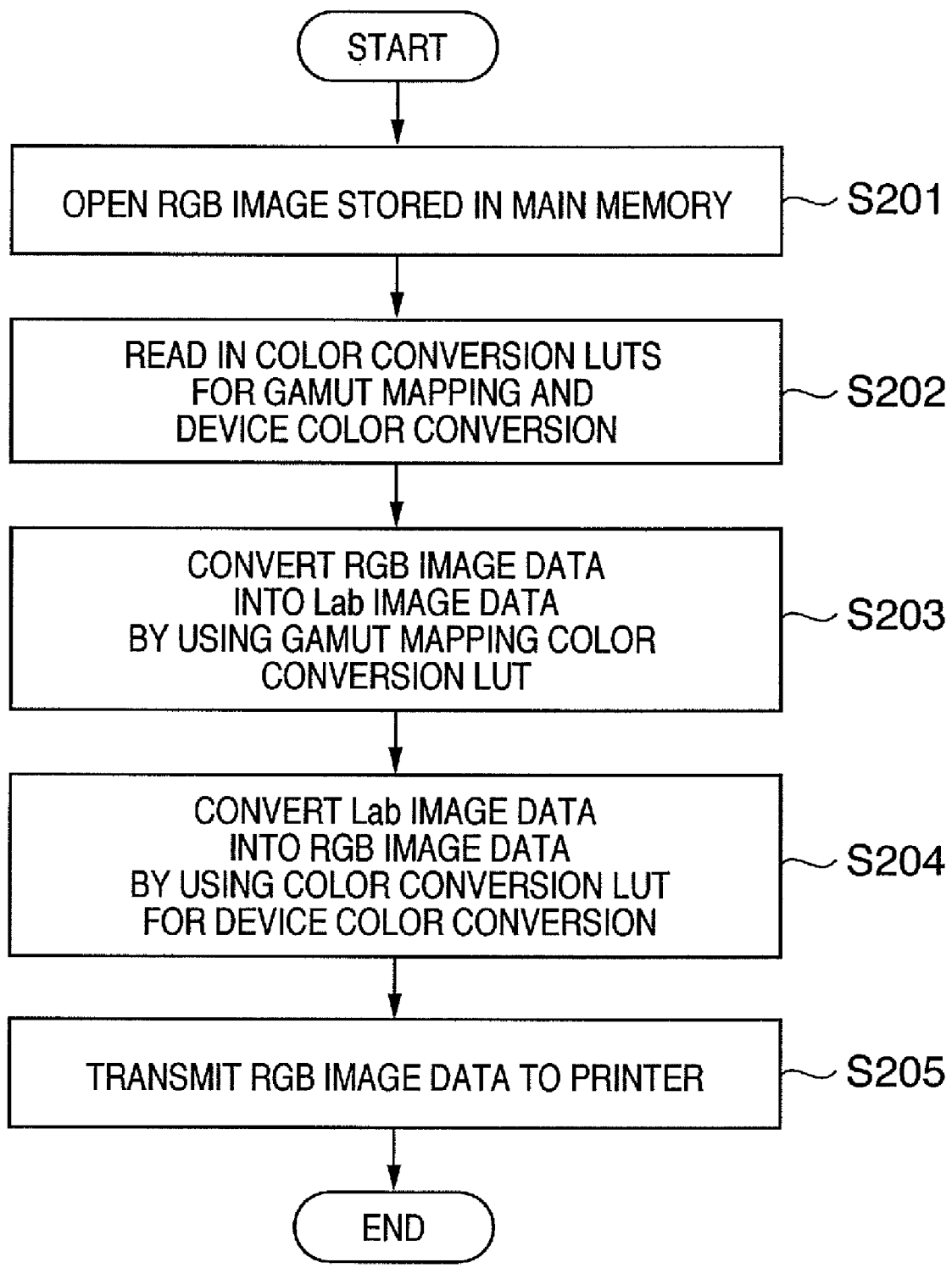
FIG. 3 is a flowchart illustrating an exemplary operation of a printer driver.

FIG. 3 is a flowchart illustrating operation of the printer driver.

First, the printer driver opens 24-bit RGB image data (each 8-bit image data without a color code) stored in the main memory 102 (S201).

Next, the printer driver reads in the main memory 102 a gamut mapping color conversion LUT stored in the HDD 105. This color conversion LUT is a lookup table generated by the color conversion LUT generation application and used for gamut-mapping the color gamut of the color monitor 107 to that of the printer 109. The printer driver further reads in the main memory 102 a color conversion LUT for device color conversion which is preset in correspondence With the printer 109 and stored in the HDD 105 (S202).

Figure 4A:
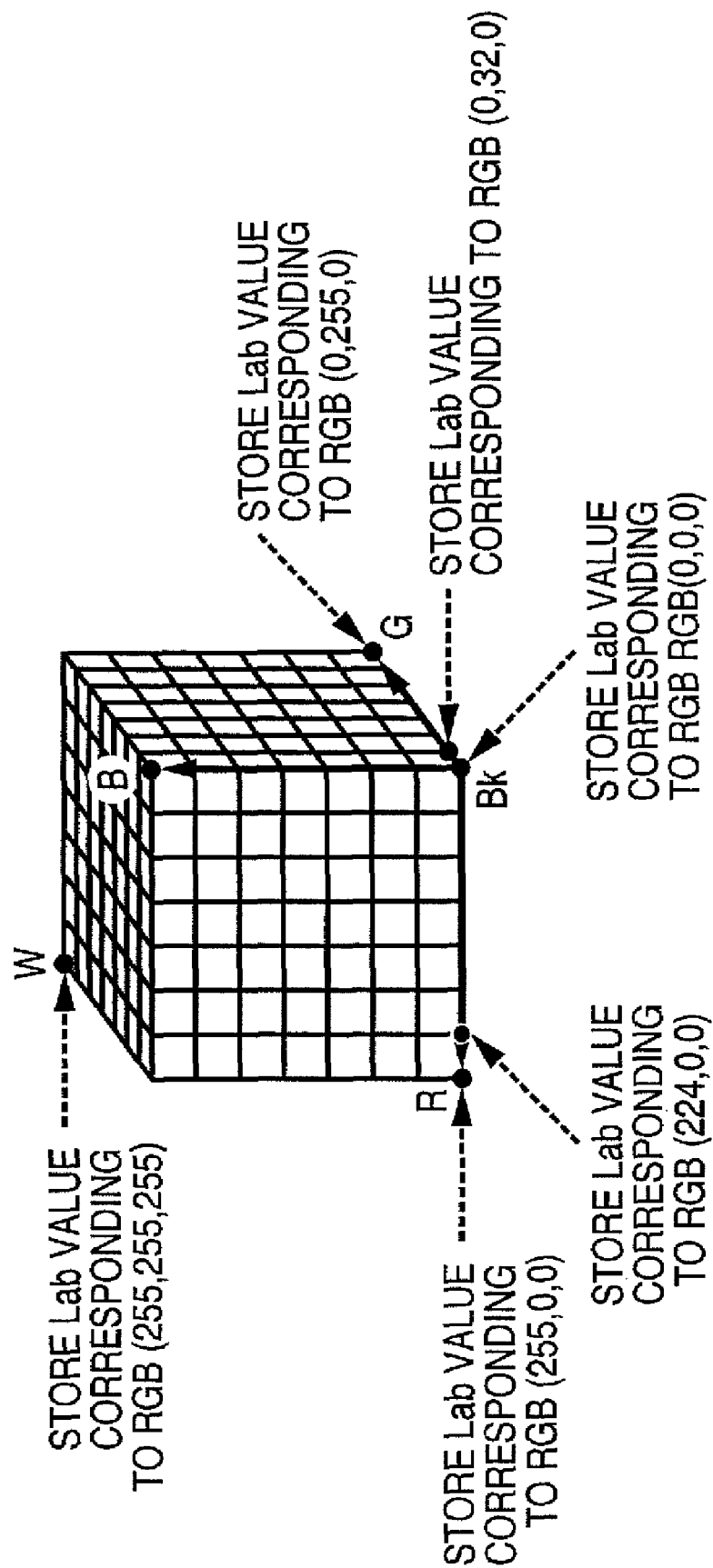
FIG. 4A is a view showing the structure of a color conversion LUT.

FIGS. 4A and 4B illustrate the gamut mapping color conversion LUT. The gamut mapping color conversion LUT has a data structure which describes the correspondence relationship between the coordinate values of lattice points in the RGB color space shown in FIG. 4A and coordinate values in the Lab color space which correspond to the respective lattice points. The data structure describes the steps of R, G, and B values in its top part, and then describes the correspondence relationship between the coordinate value and Lab value of each lattice point in the order of RGB nest.

The printer driver converts the 24-bit RGB image data into fixed-point Lab data by using the gamut mapping color conversion LUT and stores the converted data in a predetermined area of the main memory 102 (S203). This conversion uses, e.g., tetrahedron interpolation.

The printer driver converts the fixed-point Lab data into 24-bit printer RGB image data (each 8-bit image data without a color code) by using the color conversion LUT for device color conversion and stores the converted data in a predetermined area of the main memory 102 (S204).

The printer driver reads the 24-bit RGB image data from the main memory 102 and transmits the data as a print job to the printer 109 via the USB controller 108 (S205). Consequently, the printer 109 prints out a color image.

[Color Conversion LUT Generation Application]

Figure 5:
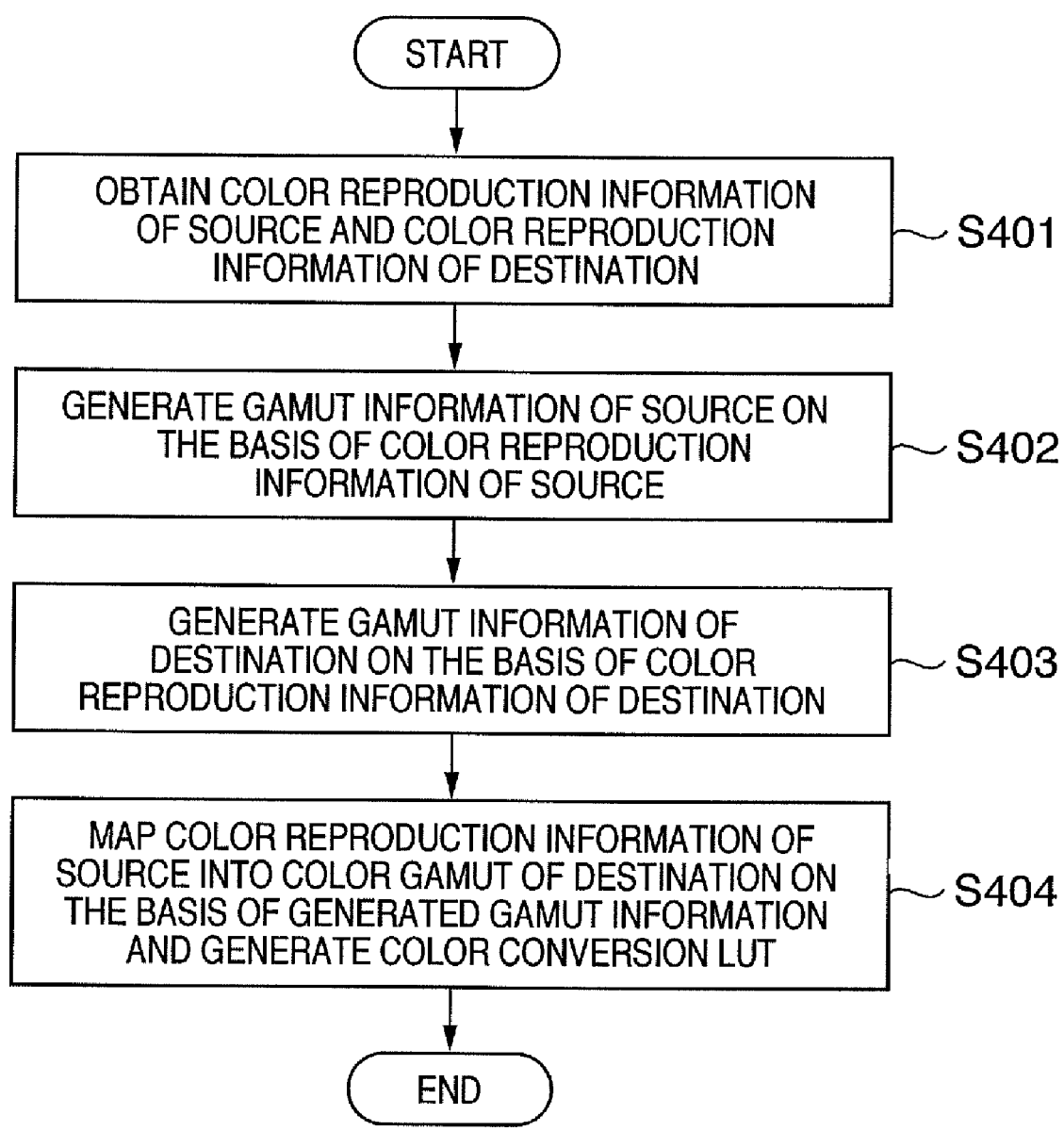
FIG. 5 is a flowchart illustrating an exemplary operation of a color conversion LUT generation application.

The color conversion LUT generation application generates, by using color reproduction information of a source and that of a destination, the color conversion LUT for performing gamut mapping. FIG. 5 is a flowchart illustrating an exemplary operation of the color conversion LUT generation application.

The color conversion LUT generation application obtains color reproduction information of a source and that of a destination from the HDD 105 (S401). For example, when the source is the color monitor 107 and the destination is the printer 109, the color conversion LUT generation application obtains color reproduction information of the color monitor 107 and that of the printer 109. The color reproduction information represented using the similar data structure as in FIG. 4B describes the correspondence relationship of device values (e.g., RGB values) and device independent values (e.g., Lab values).

For example, the color reproduction information of the color monitor 107 can be generated as follows. A color patch is displayed in the color monitor 107 on the basis of a device value (monitor RGB value) and colorimetrically measured to obtain a device independent value (Lab value). A table is generated which stores the correspondence relationship between the device value (RGB value) and device independent value (Lab value) as in FIG. 4B.

For example, the color reproduction information of the printer 109 can be generated as follows. A color patch is printed by the printer 109 on the basis of a device value (printer RGB value) and calorimetrically measured to obtain a device independent value (Lab value). A table is generated which stores the correspondence relationship between the device value (printer RGB value) and device independent value (Lab value) as in FIG. 4B.

The color conversion LUT generation application generates gamut information of the source on the basis of the color reproduction information of the source (S402), and generates gamut information of the destination on the basis of the color reproduction information of the destination (S403). The color conversion LUT generation application maps the color reproduction information of the source onto the color gamut of the destination on the basis of the pieces of the gamut information generated in steps S402 and S403, and generates a gamut mapping color conversion LUT (S404).

The gamut information can be generated from the color reproduction information. For example, when the color reproduction information is represented by the correspondence relationship between the RGB values and tab values, the Lab values corresponding to the RGB values (any of R, G, and B values is 0 or 255) located on the surfaces (six surfaces) of a hexahedron represented by the RGB values are extracted. A geographic solid generated to have these Lab values as its vertexes can be used as a color gamut. It is also possible to analyze the Lab values of the color reproduction information to generate a convex polyhedron, and use this polyhedron as a color gamut.

Figure 6:
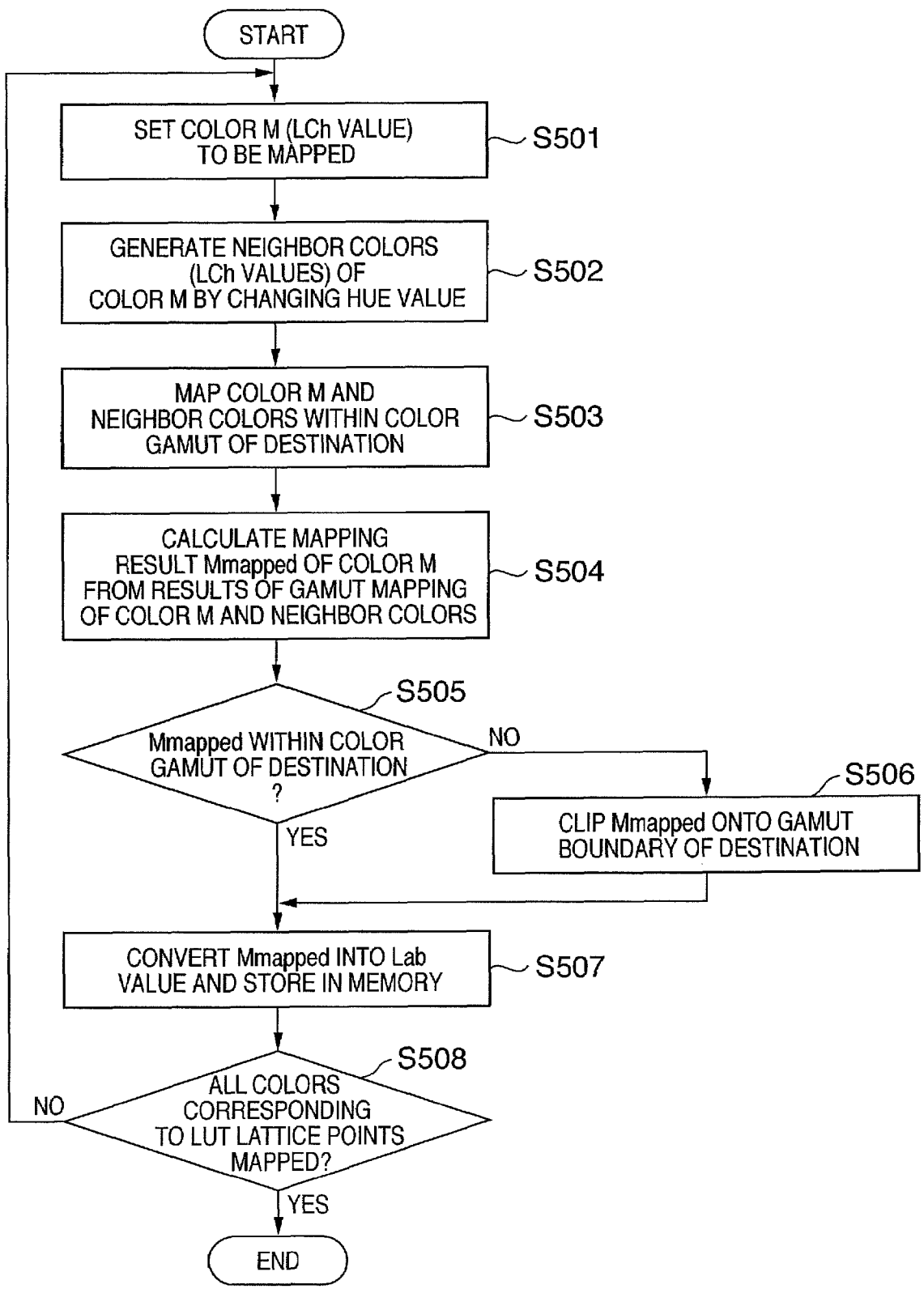
FIG. 6 is a flowchart illustrating details of mapping.

FIG. 6 is a flowchart illustrating details of mapping (S404).

The color conversion LUT generation application sets, in accordance with a predetermined procedure, a color (to be referred to as a "target color", hereinafter) M (Lch value) to be mapped/converted (S501). The mapping/conversion target color M corresponds to the color corresponding to the lattice point of the LUT.

Figure 7:
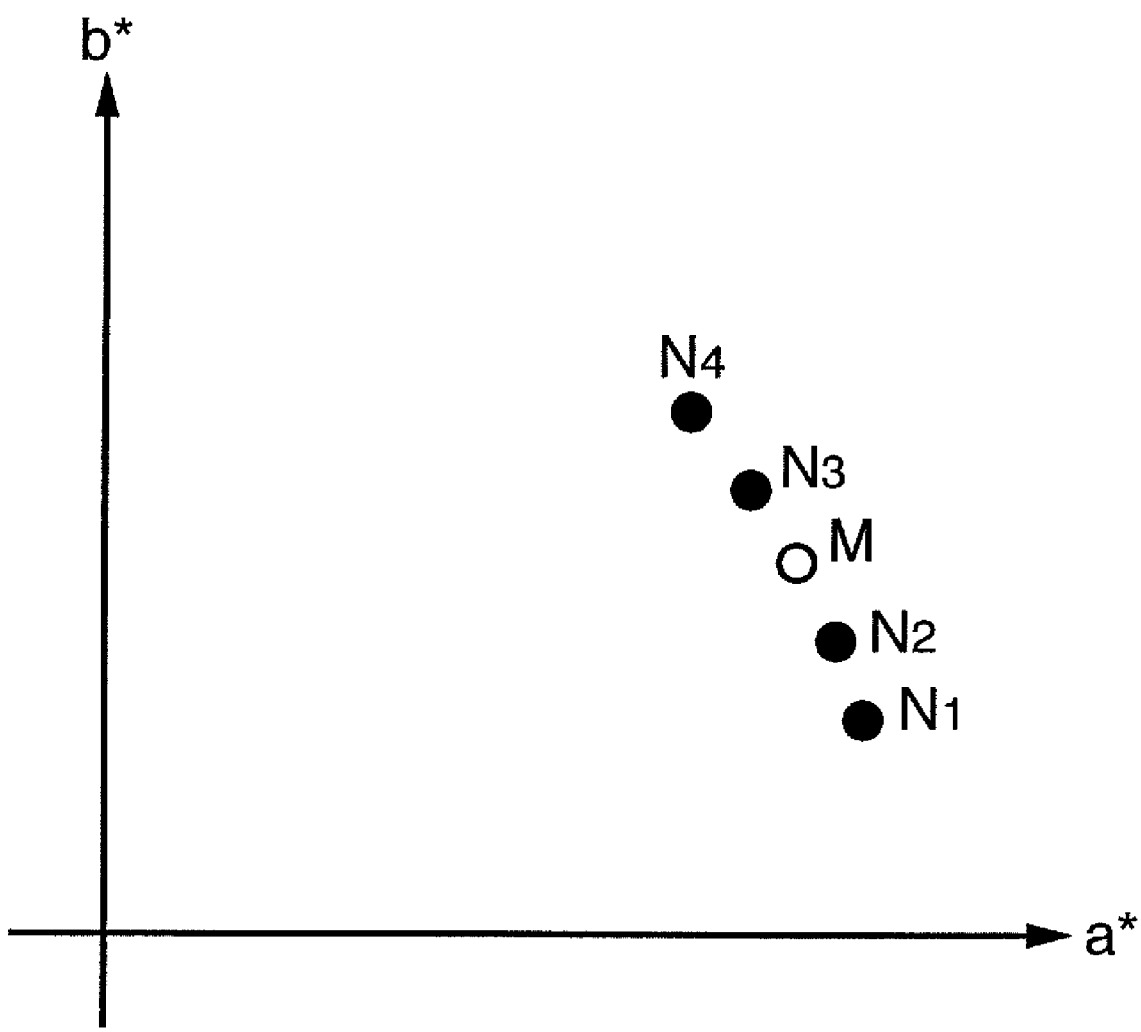
FIG. 7 is a view illustrating generation of neighbor colors.

The color conversion LUT generation application changes the hue value h of the color M while keeping the lightness L* and chroma value C* of the color M, thus generating four neighbor colors Ni (LCh values) of the color M (S502). For example, the color conversion LUT generation application equally changes the hue angle and generates neighbor colors N1 to N4 as shown in FIG. 7. The number of neighbor colors to be generated may be other than four.

The color conversion LUT generation application then performs gamut mapping based on the pieces of gamut information of the source and destination to the color M and neighbor colors Ni (S503). The color conversion LUT generation application calculates a mapping result Mmapped (mapped color) of the color M from the gamut mapping results of the color M and neighbor colors Ni obtained in step S503 (S504), by:

$$Mmapped_L = \left(M'_L + \sum_{i=1}^{4} Ni'_L\right) / 5 \quad (1)$$

$$Mmapped_C = \left(M'_C + \sum_{i=1}^{4} Ni'_C\right) / 5$$

$$Mmapped_h = M'_h$$

where mapped$_L$ is the L* value of the mapping result of the color M;

Mmapped$_C$ is the C* value of the mapping result of the color M;

Mmapped$_h$ is the h value of the mapping result of the color M;

M'$_L$ is the L* value of the gamut-mapping result of the color M;

M'$_C$ is the C* value of the gamut-mapping result of the color M;

M'$_h$ is the h value of the gamut-mapping result of the color M;

Ni'$_L$ is the L* value of the gamut-mapping result of the color Ni; and

Ni'$_C$ is the C* value of the gamut-mapping result of the color Ni.

In this manner, in the first embodiment, since the mapping result of gamut mapping of the target color M is smoothed by using the neighbor colors Ni of the target color M, a steep change in the mapping result of gamut mapping can be suppressed. In addition, setting a change amount of the hue used for generating the colors Ni smaller than the lattice point interval can make the smoothed region smaller than the lattice point interval, thus reducing the influence of the smoothing processing to the calorimetric color reproducibility.

Although the smoothing processing improves tone balance, since it changes the obtained result, it may deteriorate the calorimetric color reproduction. According to the first embodiment, by setting the colors Ni independent from the lattice points, the smoothing processing can be controlled in consideration of the tone balance and calorimetric color reproducibility.

Next, the color conversion LUT generation application determines whether the mapping result Mmapped falls inside the color gamut of the destination (S505). When the mapping result Mmapped falls outside the color gamut (NO in step S505), the color conversion LUT generation application replaces (to be referred to as "clip", hereinafter) the mapping result Mmapped by the nearest LCh value on the gamut boundary of the destination without changing the hue (S506). The color conversion LUT generation application converts the mapping result Mmapped into a Lab value and stores the converted value in a predetermined area of the main memory 102 (S507).

The color conversion LUT generation application determines whether all colors corresponding to the lattice points of the LUT have been mapped (S508), and repeats the steps S501 to S507 until all colors are mapped.

Figure 8:
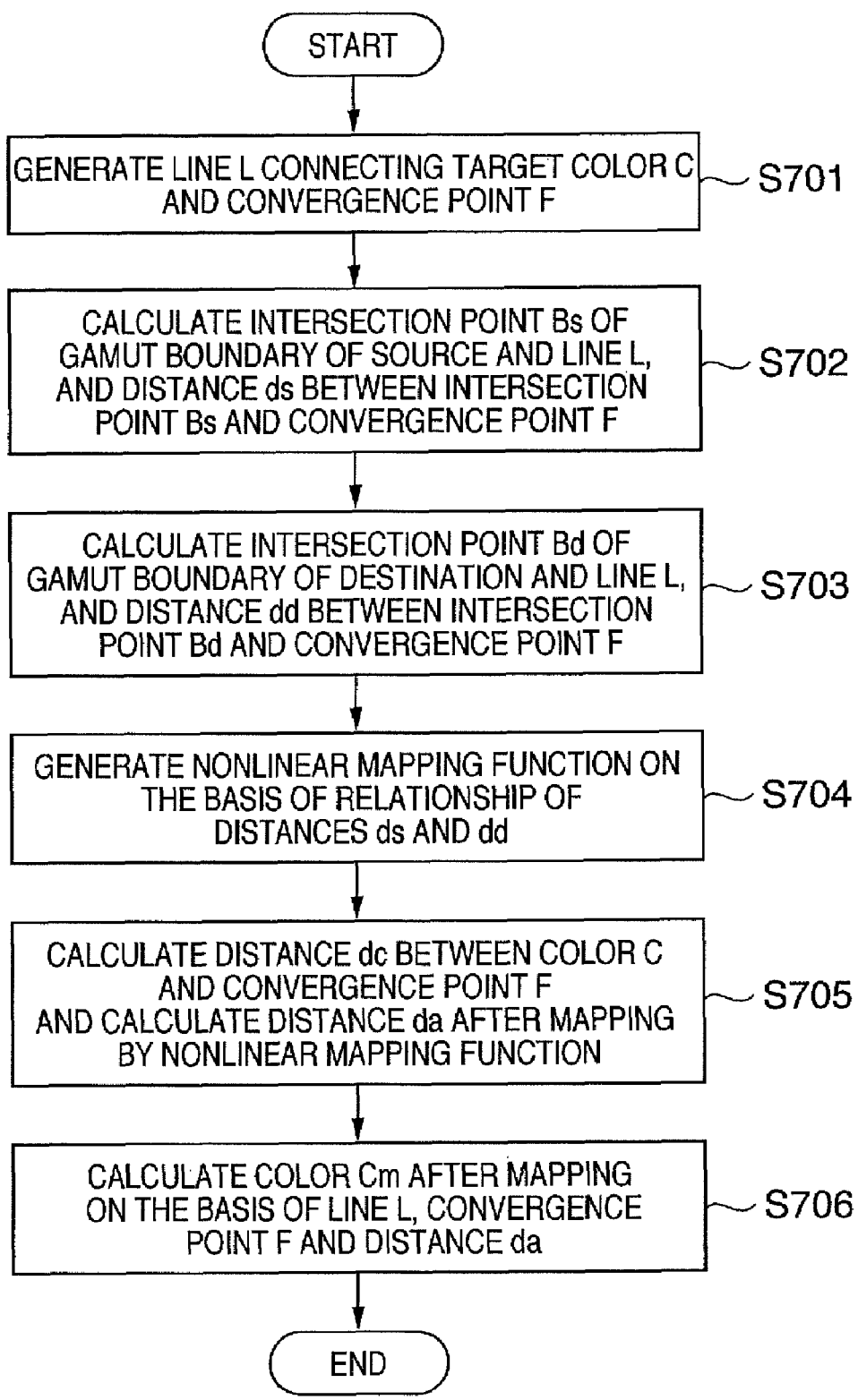
FIG. 8 is a flowchart illustrating details of gamut mapping.
Figure 9A:
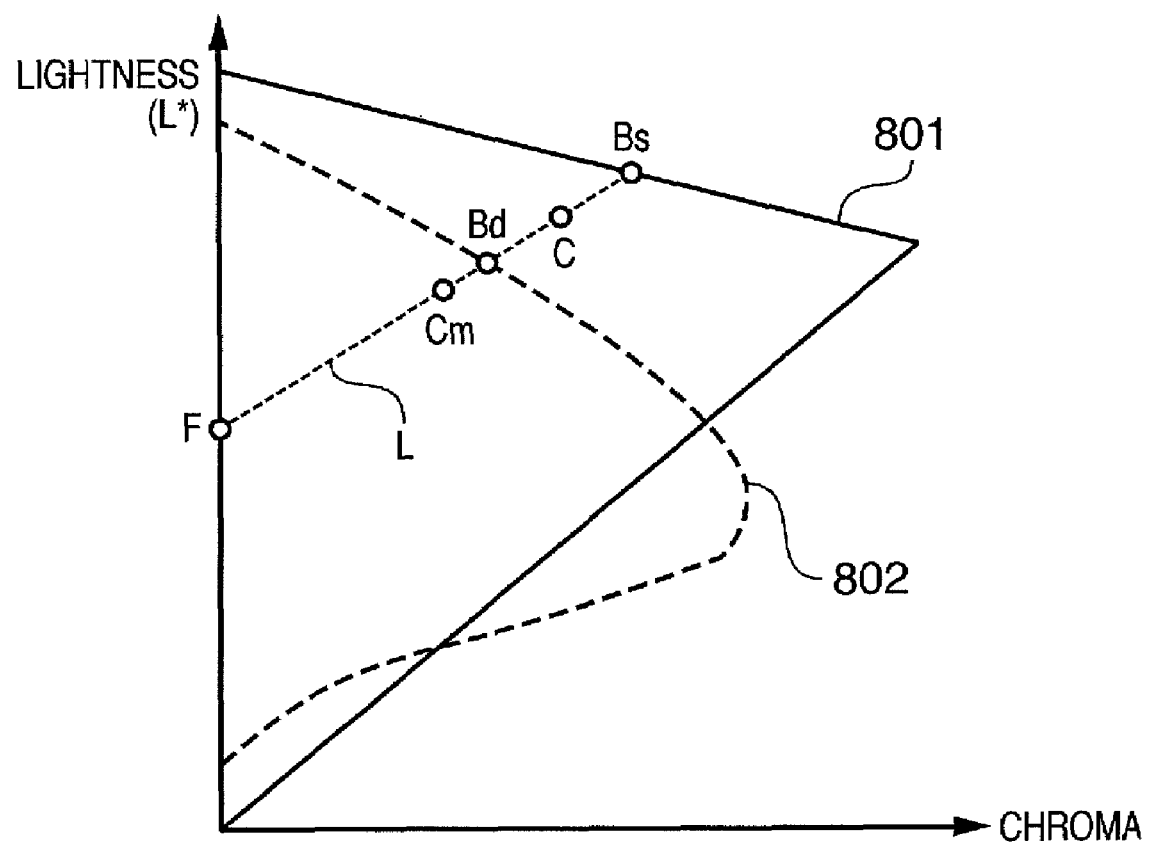
FIGS. 9A and 9B are views illustrating gamut mapping.
Figure 9B:
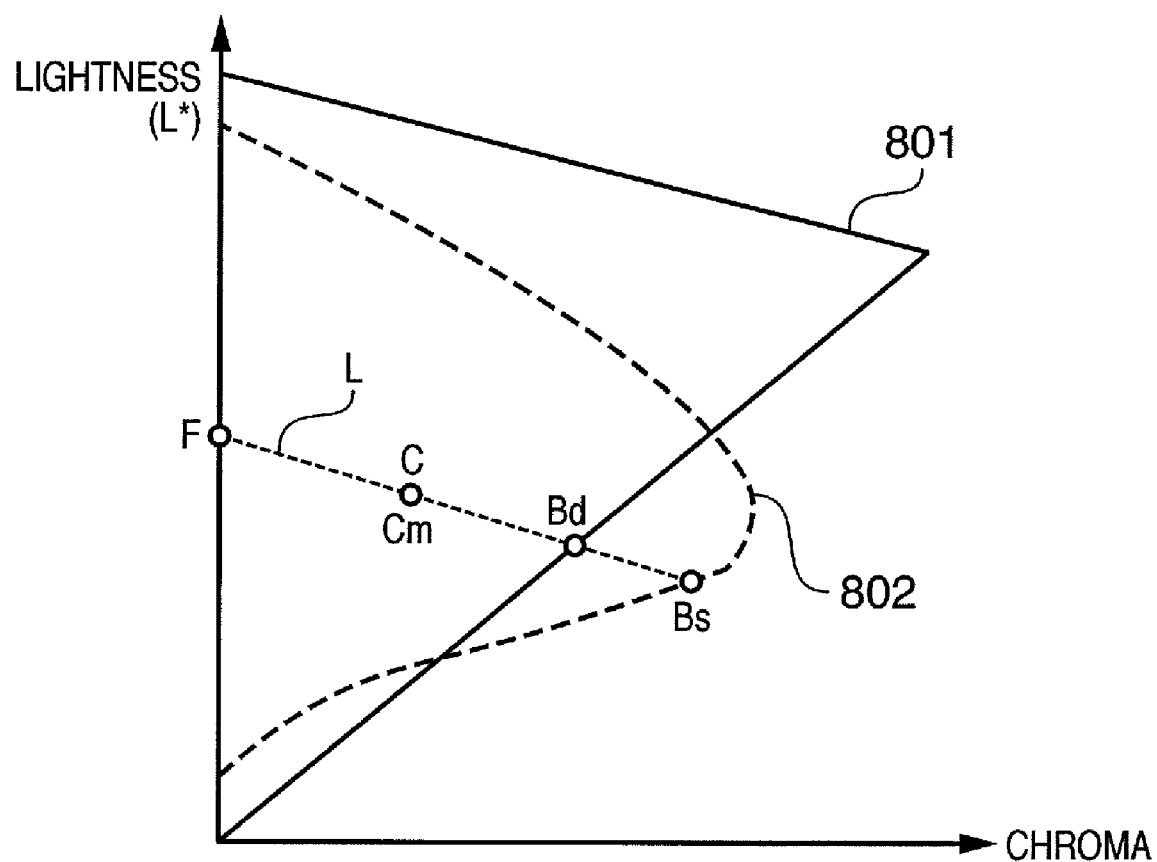

FIG. 8 is a flowchart illustrating details of gamut mapping (S503), and FIGS. 9A and 9B are illustrate gamut mapping (S503).

First, the color conversion LUT generation application generates a line L which connects a target color C (each corresponding to the above-described colors M and Ni) and a predetermined convergence point F (S701). The color conversion LUT generation application calculates an intersection point Bs of the line L and a gamut boundary 801 of the gamut source, and a distance ds between the intersection point Bs and the convergence point F (S702). The color conversion LUT generation application calculates an intersection point Bd of the line L and a gamut boundary 802 of the destination, and a distance dd between the intersection point Bd and the convergence point F (S703).

Figure 10:
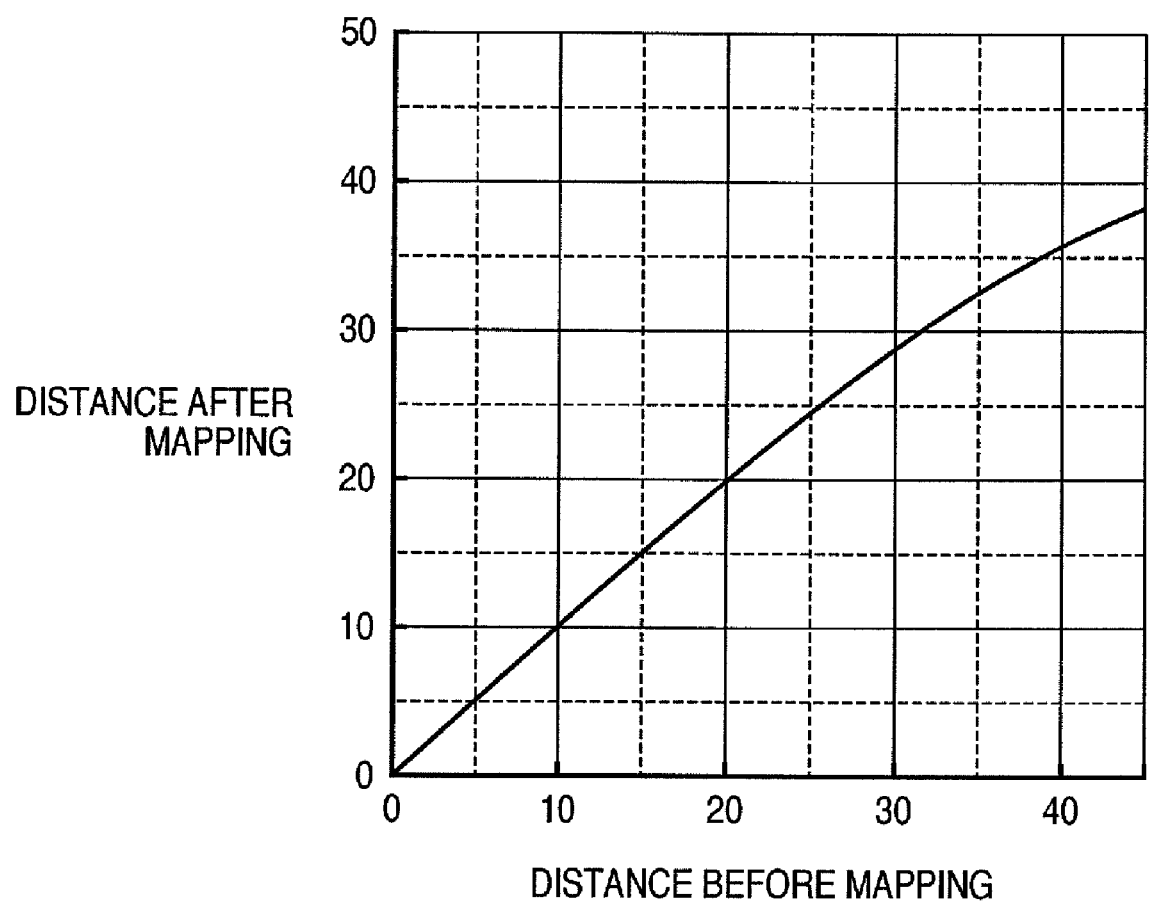
FIG. 10 is a view showing an example of a nonlinear mapping function.

The color conversion LUT generation application generates a nonlinear mapping function (quadratic curve) the slope of which is 1 near the origin and decreases as it gets apart from the origin to compress the distance ds into the distance dd (S704). FIG. 10 illustrates an example of the nonlinear mapping function.

The color conversion LUT generation application calculates a distance dc between the target color C and convergence point F, inputs the distance dc into the nonlinear mapping function, and sets the output of the function to a mapped distance da (S705). The color conversion LUT generation application calculates a color Cm having the distance dc from the convergence point F on the line L and sets the color Cm as a gamut mapping result (S706).

The target color C is mapped to the color Cm by the above-described processing. When the color C is close to the intersection point Bs of the gamut boundary 801 of the source (FIG. 9A), the value after mapping greatly changes from the value before mapping by the nonlinear mapping function. When the color C is far from the intersection point Bs (close to the convergence point F) (FIG. 9B), a change in the values before mapping and after mapping is small or nearly zero.

Figure 1A:
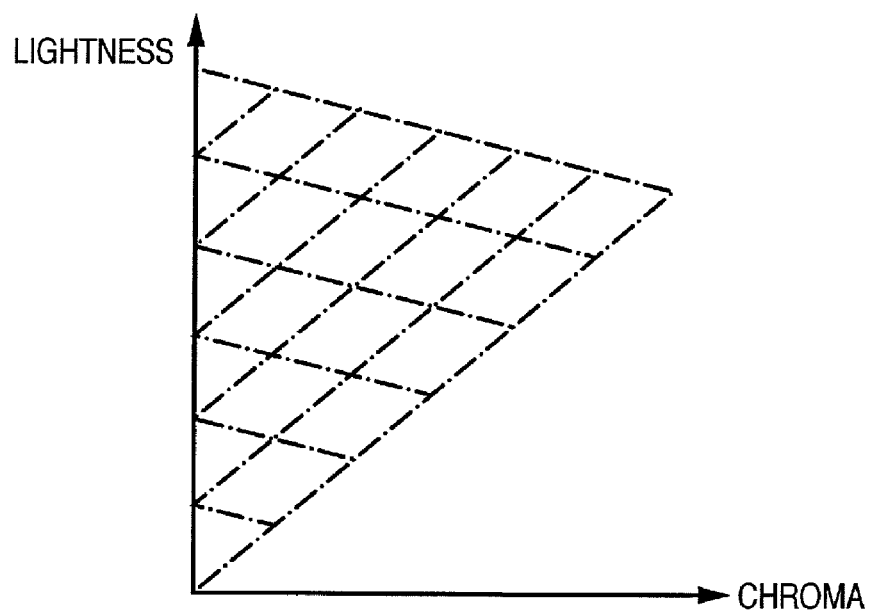
FIGS. 1A and 1B are views showing a monitor gamut and a printer gamut, respectively, as an example of a color gamut.
Figure 1B:
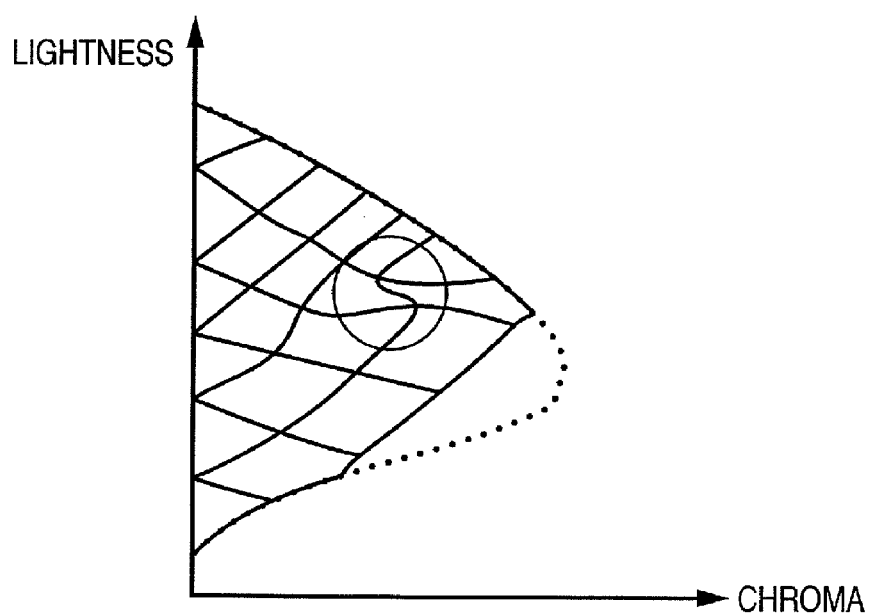

By the gamut mapping shown in FIG. 8, for example, the monitor gamut of the cyan hue shown in FIG. 1A is mapped to the color gamut represented by the solid lines in FIG. 11. As is notably shown in a color gamut indicated by the circle in FIG. 11, the tone characteristics can be improved compared to FIG. 1B. The dotted line in FIG. 11 represents a printer gamut.

[Device Color Conversion LUT Generation Application]

Figure 12:
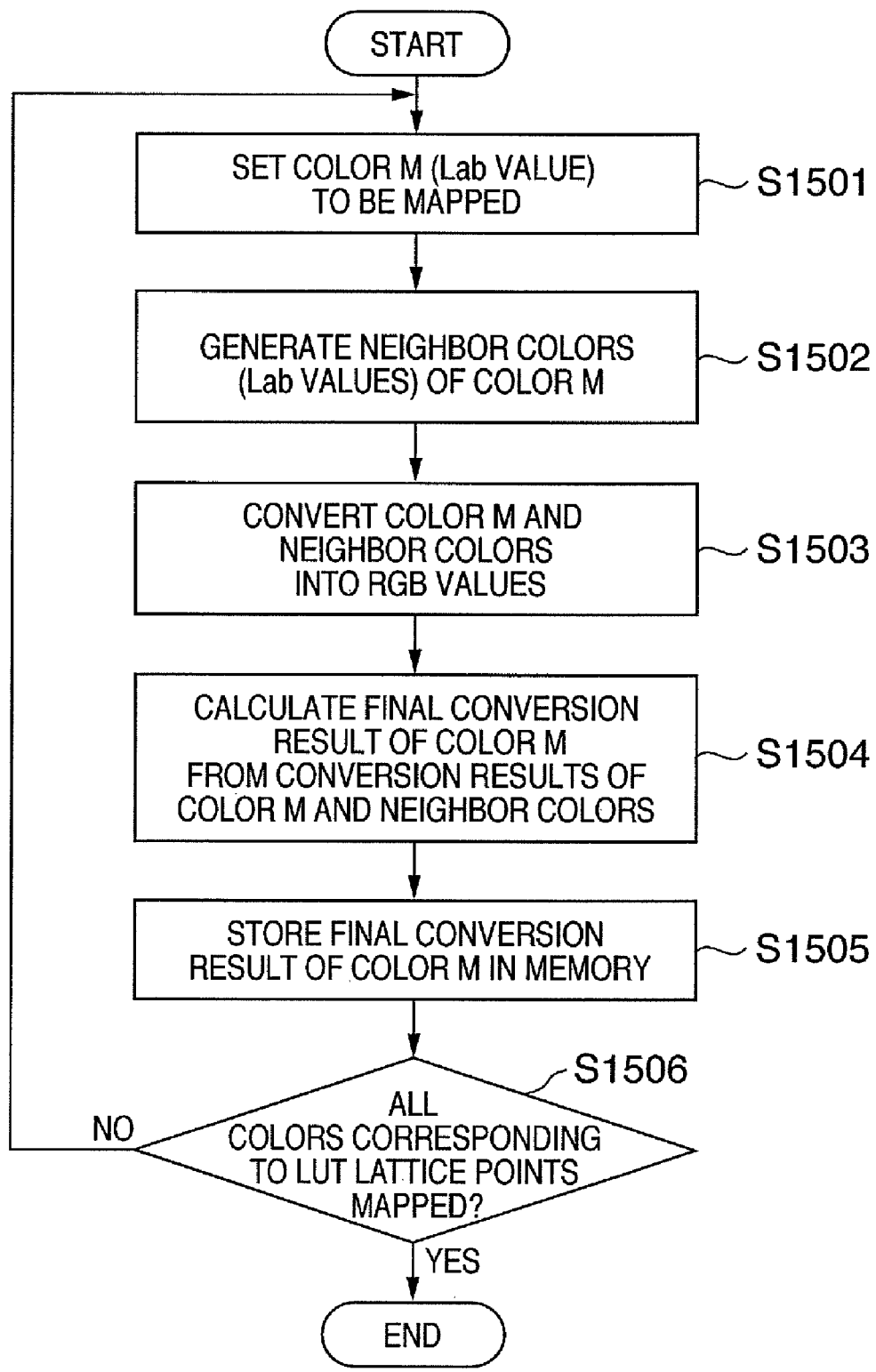
FIG. 12 is a flowchart illustrating details of RGB value calculation.

The device color conversion LUT generation application generates, by using device color reproduction information, a color conversion LUT for converting a gamut-mapped device independent color (e.g., Lab value) into a device color (e.g., printer RGB value). FIG. 12 is a flowchart illustrating an exemplary operation of the device color conversion LUT generation application.

Figure 13:
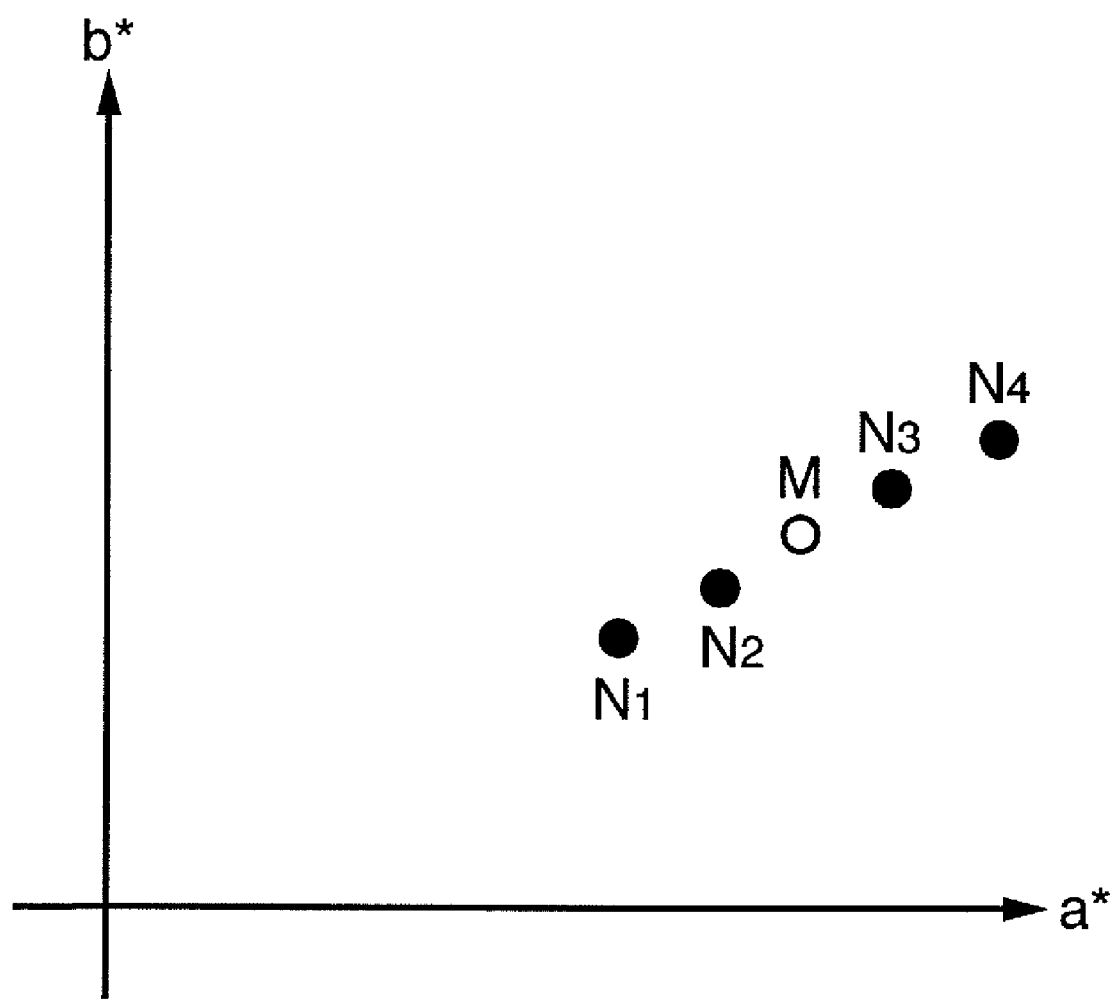
FIG. 13 is a view illustrating generation of neighbor colors.

The device color conversion LUT generation application sets a conversion target color M (device independent color) corresponding to the lattice point of the color conversion LUT (S1501) and changes its chroma value while keeping the hue and chroma value unchanged, thus generating, e.g., four of neighbor colors Ni of the color M (S1502). For example, the device color conversion LUT generation application generates neighbor colors N1 to N4 as shown in FIG. 13 by equally changing the chroma value.

The device color conversion LUT generation application converts each Lab value of the color M and neighbor colors Ni into a device color value (S1503). The details of this conversion processing will be described later. The device color conversion LUT generation application calculates a final conversion result CR (mapped color) of the color M from the conversion results of the color M and neighbor colors Ni (S1504) using:

$$CR_R = \left(CM_R + \sum_{i=1}^{4} CNi_R\right)/5 \quad (2)$$

$$CR_G = \left(CM_G + \sum_{i=1}^{4} CNi_G\right)/5$$

$$CR_B = \left(CM_B + \sum_{i=1}^{4} CNi_B\right)/5$$

where $CR_R$ is the R value of the final conversion result of the color M;
$CR_G$ is the G value of the final conversion result of the color M;
$CR_B$ is the B value of the final conversion result of the color M;
$CM_R$ is the R value of the conversion result of the color M;
$CM_G$ is the G value of the conversion result of the color M;
$CM_B$ is the B value of the conversion result of the color M;
$CNi_R$ is the R value of the conversion result of the color Ni;
$CNi_G$ is the G value of the conversion result of the color Ni; and
$CNi_B$ is the B value of the conversion result of the color Ni.

In this manner, in the first embodiment, since the color conversion result of the target color M is smoothed by using the neighbor colors Ni of the target color M, a steep change in the result of device color conversion can be suppressed. In addition, setting a change amount of the hue used for generating the colors Ni smaller than the lattice point interval can make the smoothed region smaller than the lattice point interval, thus reducing the influence of the smoothing processing to the calorimetric color reproducibility.

Although the smoothing processing improves the tone characteristics, since it changes the obtained result, it may deteriorate the calorimetric color reproducibility. According to the first embodiment, by setting the colors Ni independent from the lattice points, the smoothing processing can be controlled in consideration of the tone characteristics and colorimetric color reproducibility.

The device color conversion LUT generation application stores the final conversion result CR (mapped color) in a predetermined area of the main memory 102 (S1505). The device color conversion LUT generation application determines whether all colors corresponding to the lattice points of the LUT have been mapped (S1506), and repeats steps S1501 to S1505 until all colors are mapped.

FIG. 14 is a flowchart illustrating details of device independent value (Lab value) to device value (RGB value) conversion (S1503). Note that equation F(•) to be used in the following description calculates the color difference between an RGB value C and a target color Lab value (i.e., Lab value of any of the color M and neighbor colors Ni obtained in step S1502) of Lab to RGB conversion. Equation F(•) is given by:

$$F(C)=\sqrt{[\{L(C)-In_L\}^2+\{a(C)-In_a\}^2+\{b(C)-In_b\}^2]} \quad (3)$$

where $L(C)$, $a(C)$, and $b(C)$ are conversions to calculate the L*, a*, and b* values for the RGB value C, respectively, and $In_L$, $In_a$, and $In_b$ are the L*, a*, and b* values for the target color Lab value of Lab to RGB conversion, respectively.

The device color conversion LUT generation application sets the initial value of the RGB value C (Cr, Cg, Cb)$^T$ (S1701) and performs approximate calculation to obtain a steepest gradient vector $\nabla=(\nabla r, \nabla g, \nabla b)^T$ at a search point C (S1702) by:

$$\nabla r=\{F(C+\Delta Cr)-F(C-\Delta Cr)\}/2\Delta$$

$$\nabla g=\{F(C+\Delta Cg)-F(C-\Delta Cg)\}/2\Delta$$

$$\nabla b=\{F(C+\Delta Cb)-F(C-\Delta Cb)\}/2\Delta \quad (4)$$

where
$\Delta Cr=(\Delta, 0, 0)^T$;
$\Delta Cg=(0, \Delta, 0)^T$;
$\Delta Cb=(0, 0, \Delta)^T$; and
$\Delta$ is a given real number and T represents the transpose of a matrix.

The device color conversion LUT generation application updates the RGB value of the search point C (S1703) by:

$$C=C+\alpha \times \nabla \quad (5)$$

where $\alpha$ is a given positive real number.

The device color conversion LUT generation application calculates by using F(C) the color difference between the RGB value C updated in step S1703 and the target color Lab value of Lab to RGB conversion as an evaluation value (S1704). When it is determined that condition "the number of iterative calculation is smaller than a predetermined number and the evaluation value is equal to or more than ΔD" is satisfied (YES in step S1705), the process returns to step S1702. Otherwise, the device color conversion LUT generation application sets the RGB value C as the color of the Lab to RGB conversion result.

The CPU 101 stores in a predetermined area of the HDD 105 the color conversion LUT generated in this manner and used for gamut-mapping the color gamut of the color monitor 107 to that of the printer 109. The types of color monitors and printers to which this color conversion LUT is applicable are described in the header of the color conversion LUT. The printer driver searches for the color conversion LUT for gamut-mapping the color gamut of the color monitor 107 to that of the printer 109 from the description in the header of the color conversion LUT and uses the found LUT in the above-described processing. The CPU 101 can register the gamut mapping color conversion LUT corresponding to the types of the color monitor and printer in a file server (not shown) via, e.g., the LAN 113 or distribute the LUT to another image processing apparatus, in accordance with a user's instruction.

In this manner, neighbor colors of a mapping target (conversion target) color are generated and the mapping (conversion) result of the mapping target (conversion target) color is corrected by smoothing the mapping result (conversion result). With this process, any color conversion can be corrected to have satisfactory tone reproduction. Therefore, satisfactory tone reproduction can be implemented in gamut mapping color conversion and device color conversion (color conversion from a device independent color into a device color).

Modification of Embodiment

In the above embodiment, a Lab color space of a uniform color space is exemplified as a color space to generate neighbor colors for smoothing. However, a color space used to generate neighbor colors is not limited to that particular color space, and a Luv color space and the like may be used. An appearance space obtained by using CIECAM02 or CIECAM97s may be also used. An HSV color space may be also used.

In the above embodiment, as a method of generating neighbor colors for smoothing, changing a hue value or chroma value is exemplified. However, a method of generating neighbor colors is not limited to that particular method, and neighbor colors may be generated by changing any one of a hue value, lightness value, and chroma value, or a combination of two or three of the values.

For example, when the lightness value is changed in the first embodiment, the lightness value of the mapping result of the mapping target color M is set as the lightness value of the mapped color. The average value of the chroma values of the mapping results of the mapping target color M and neighbor colors Ni is set as the chroma value of the mapped color. The average value of the hue values of the mapping results of the mapping target color M and neighbor colors Ni can be set as the hue value of the mapped color. In the same manner, when the chroma value is changed, the average value of the lightness values of the mapping results of the mapping target color M and neighbor colors Ni is set as the lightness value of the mapped color. The chroma value of the mapping result of the mapping target color M is set as the chroma value of the mapped color. The average value of the hue values of the mapping results of the mapping target color M and neighbor colors Ni is set as the hue value of the mapped color.

The clipping in step S506 can be performed as follows. Upon changing the hue value, the changed hue value is kept constant. Upon changing the lightness value, the changed lightness value is kept constant. Upon changing the chroma value, the changed chroma is kept constant. When three of the hue value, lightness value, and chroma value are changed, the clipping can be performed while, e.g., keeping the color difference minimal.

In the above embodiment, smoothing processing is performed in generating the color conversion LUT and device color conversion LUT. However, smoothing processing may be performed in generating only one of the color conversion LUT and device color conversion LUT.

A gamut mapping method other than the method shown in FIG. 8 can be used. For example, a method of mapping a mapping target color as to have a minimal color difference can be used. When the gamut mapping method of minimizing the color difference is used, only gamut information of the destination gamut is required.

Other Exemplary Embodiments

The present invention can be applied to a system constituted by a plurality of devices (e.g., host computer, interface, reader, printer) or to an apparatus comprising a single device (e.g., copying machine, facsimile machine).

Further, the present invention can provide a storage medium storing program code for performing the above-described processes to a computer system or apparatus (e.g., a personal computer), reading the program code, by a CPU or MPU of the computer system or apparatus, from the storage medium, then executing the program.

In this case, the program code read from the storage medium realizes the functions according to the embodiments.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, besides above-described functions according to the above embodiments can be realized by executing the program code that is read by a computer, the present invention includes a case where an OS (operating system) or the like working on the computer performs a part or entire processes in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiments.

In a case where the present invention is applied to the aforesaid storage medium, the storage medium stores program code corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-026181, filed Feb. 2, 2006, which is hereby incorporated by reference herein in its entirety.

What is claimed is:

1. A color processing method performed by a color processing apparatus including a processor and a memory, the method comprising:
   obtaining gamut information of a color gamut of a destination device;
   setting a mapping target color represented by lightness, chroma and hue values in a color gamut of a source device, the mapping target color corresponding to a lattice point of a color conversion table stored in the memory;
   generating a plurality of neighbor colors of the mapping target color by repeatedly changing the hue value of the mapping target color in accordance with a number of the plurality of neighbor colors while keeping unchanged the lightness and chroma values of the mapping target color in the color gamut of the source device, wherein the plurality of neighbor colors exist between the lattice point of the mapping target color and lattice points adjacent to the lattice point of the mapping target color in the color gamut of the source device;

mapping the mapping target color and each neighbor color of the plurality of neighbor colors into the color gamut of the destination device based on the gamut information;

calculating, using the processor, a mapped color corresponding to the mapping target color in the color gamut of the destination device, wherein the mapped color has a mapped lightness value, a mapped chroma value and a mapped hue value, the mapped lightness and chroma values being calculated by averaging lightness values and chroma values obtained in the mapping of the mapping target color and the plurality of neighbor colors, and the mapped hue value being a result of the mapping of the mapping target color; and storing the mapped color in the color conversion table.

2. The method according to claim 1, wherein changing the hue value of the mapping target color includes equally changing a hue angle, and wherein a change amount of the hue angle is smaller than a lattice point interval of the color conversion table.

3. The method according to claim 1, further comprising:

determining whether the mapped color falls inside the color gamut of the destination device; and clipping the mapped color onto a boundary of the color gamut of the destination device when the mapped color falls outside the color gamut of the destination device.

4. The method according to claim 1, wherein the mapping is performed using a convergence point set in the color gamut of the destination device.

5. A color processing apparatus including a processor and a memory, comprising:

an obtaining section arranged to obtain gamut information of a color gamut of a destination device;

a setting section arranged to set a mapping target color represented by lightness, chroma and hue values in a color gamut of a source device, the mapping target color corresponding to a lattice point of a color conversion table;

a generator arranged to generate a plurality of neighbor colors of the mapping target color by repeatedly changing the hue value of the mapping target color in accordance with a number of the plurality of neighbor colors while keeping unchanged the lightness and chroma values of the mapping target color in the color gamut of the source device, wherein the plurality of neighbor colors exist between the lattice point of the mapping target color and lattice points adjacent to the lattice point of the mapping target color in the color gamut of the source device;

a mapping section arranged to map the mapping target color and each neighbor color of the plurality of neighbor colors into the color gamut of the destination device based on gamut information;

a calculator section included in the processor and arranged to calculate a mapped color corresponding to the mapping target color in the color gamut of the destination device, wherein the mapped color has a mapped lightness value, a mapped chroma value and a mapped hue value, the mapped lightness and chroma values being calculated by averaging lightness values and chroma values obtained in the mapping of the mapping target color and the plurality of neighbor colors, and the mapped hue value being a result of the mapping of the mapping target color; and a storing section arranged to store the mapped color in the color conversion table.

6. A computer program product stored in a non-transitory computer-readable medium comprising computer program code for a color processing, the computer program product comprising:

computer-executable instruction for obtaining gamut information of a color gamut of a destination device;

computer-executable instruction for setting a mapping target color represented by lightness, chroma and hue values in a color gamut of a source device, the mapping target color corresponding to a lattice point of a color conversion table;

computer-executable instruction for generating a plurality of neighbor colors of the mapping target color by repeatedly changing the hue value of the mapping target color in accordance with a number of the plurality of neighbor colors while keeping unchanged the lightness and chroma values of the mapping target color in the color gamut of the source device, wherein the plurality of neighbor colors exist between the lattice point of the mapping target color and lattice points adjacent to the lattice point of the mapping target color in the color gamut of the source device;

computer-executable instruction for mapping the mapping target color and each neighbor color of the plurality of neighbor colors into the color gamut of the destination device based on the gamut information;

computer-executable instruction for calculating a mapped color corresponding to the mapping target color in the color gamut of the destination device, wherein the mapped color has a mapped lightness value, a mapped chroma value and a mapped hue value, the mapped lightness and chroma values being calculated by averaging lightness values and chroma values obtained in the mapping of the mapping target color and the plurality of neighbor colors, and the mapped hue value being a result of the mapping of the mapping target color; and computer-executable instruction for storing the mapped color in the color conversion table.

* * * * *